United States Patent [19]

Inowaki

[11] 3,911,773

[45] Oct. 14, 1975

[54] APPARATUS FOR CUTTING MATERIAL AT FIXED LENGTH

[75] Inventor: Ikuji Inowaki, Isezaki, Japan

[73] Assignee: Eisai Co., Ltd., Tokyo, Japan

[22] Filed: Mar. 11, 1974

[21] Appl. No.: 449,836

[30] Foreign Application Priority Data

Mar. 15, 1973   Japan.............................. 48-30427

[52] U.S. Cl. ...................... 83/320; 83/317; 83/324; 83/328
[51] Int. Cl.²...................... B26D 1/56; B23D 25/04
[58] Field of Search ............. 83/317, 318, 320, 324, 83/328

[56] References Cited
UNITED STATES PATENTS

| | | | |
|---|---|---|---|
| 1,226,066 | 5/1917 | DuBrul | 83/318 |
| 1,359,058 | 11/1920 | Haase et al. | 83/317 |
| 2,444,465 | 7/1948 | Peters | 83/318 X |
| 3,244,048 | 4/1966 | Salger | 83/328 X |
| 3,800,646 | 4/1974 | Benz | 83/320 |

*Primary Examiner*—Willie G. Abercrombie
*Attorney, Agent, or Firm*—Woodhams, Blanchard and Flynn

[57] ABSTRACT

An apparatus for cutting a moving object to a fixed length and provided with a lateral movement mechanism adapted to effect lateral reciprocating movement of upper and lower cutters along a stroke having a predetermined travelling distance, and a vertical movement mechanism adapted to effect vertical reciprocating movement of the upper cutter in synchronization with the lateral reciprocating movement of its own, wherein there exists a constant ratio between the velocity of the lateral reciprocating movement of both cutters and the velocity of the moving workpiece, and the workpiece under conveyance is cut by means of both the upper and the lower cutters in the closing phase of the forward stroke of the lateral reciprocating movement thereof.

9 Claims, 6 Drawing Figures

APPARATUS FOR CUTTING MATERIAL AT FIXED LENGTH

BACKGROUND OF THE INVENTION

The present invention relates to an apparatus for cutting a moving workpiece into a fixed length.

The present invention relates particularly to a cutting apparatus suitable for obtaining an ampoule case having a fixed length as shown in FIG. 1 by cutting a corrugated case band in which ampoules are accommodated.

Heretofore, as an apparatus for cutting a moving case band to obtain an ampoule case of fixed length, an apparatus of a type in which a clutch is used to operate a Thomson cutter by means of a high speed rotatable shaft, and an apparatus of a type in which a pair of upper and lower rotary cutters are operated, have been available.

However, in the former apparatus, there are drawbacks that the cutters are of a large size and accordingly large driving force is required and also vibration is great, and in the latter, not only the cutters become expensive but also the cutters are required to be changed to cutters whose sizes are suitable for each cutting length and therefore it is extremely inconvenient.

An object of the present invention is to provide an apparatus for cutting a certain object to a fixed length which is capable of eliminating the drawbacks brought about by the conventional apparatuses as mentioned in the foregoing.

Another object of the present invention is to provide an apparatus for cutting a certain object to a fixed length in which the upper and lower cutters are reciprocated in the lateral direction and the upper cutter is caused to reciprocate vertically by being synchronized with said reciprocating motion, and at an intermediate position of the cutters at the time of forward motion of the upper and lower cutters, the workpiece is transferred in the same direction, and the moving workpiece is arranged to be cut by the lower cutter disposed in opposition to the upper cutter that moves downward adjacent the terminal stroke of the forward moving stroke, and thus it allows the use of low cost cutters and also there is no need of making the entire size of the apparatus of large size, and yet the vibration at the time of cutting can be held to a minimum.

A further object of the present invention is to provide an apparatus for cutting a certain object to a fixed length in which the upper cutter is caused to reciprocate in the vertical direction by being synchronized with the reciprocating motion against the lateral direction of the upper and lower cutters, and a ratio of the reciprocating motion speed in the lateral direction of the upper and lower cutters and the transfer speed of the workpiece is made constant, whereby the workpiece can be accurately cut into pieces of a fixed length.

A still further object of the present invention is to provide an apparatus for cutting a certain object to a fixed length in which a device capable of changing the transfer stroke is mounted on a mechanism for lateral motion of the upper and lower cutters, and thus the cut length of the workpiece can be changed.

A still further object of the present invention is to provide an apparatus for cutting a certain object to a fixed length in which the lateral motion mechanism increases and reduces the speed of the upper and lower cutters gradually at the start and end periods of the forward motion, and moreover at the returning motion, it makes a quick backward motion, whereby the impact on the entire apparatus is moderated.

A still further object of the present invention is to provide an apparatus for cutting a certain object to a fixed length in which the vertical motion mechanism completes the downward stroke of the upper cutter before the completion of the forward moving stroke of the upper and lower cutters, and initiates the ascending of the upper cutter at the time of continuation of the forward motion of the upper and lower cutters, and thus the upper cutter does not interfere with the travelling of the successive workpieces.

The present invention will be explained more particularly with reference to the accompanying drawings where:

DETAILED DESCRIPTION OF THE INVENTION

Figure 1:
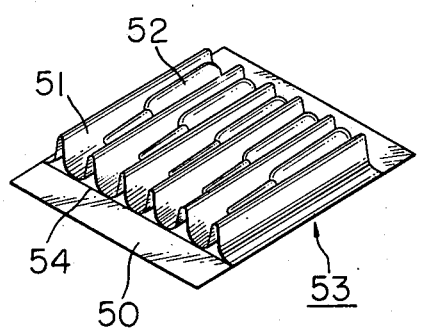
FIG. 1 is a perspective view of an ampoule case which is one example of the fixed length workpiece obtained by the cutting apparatus according to the present invention.

In FIG. 1, the ampoule case 53 is shown which is obtained by the cutting apparatus according to the present invention and said case 53 is formed by attaching a reverse surface of a valley portion of a corrugated paper 51 on a flat shaped base paper 50, and in said valley, the ampoule 52 is placed, and numeral 54 denotes a folding line formed at a portion corresponding to both edges of the corrugated paper 51 at both sides of the base paper 50.

Figure 2:
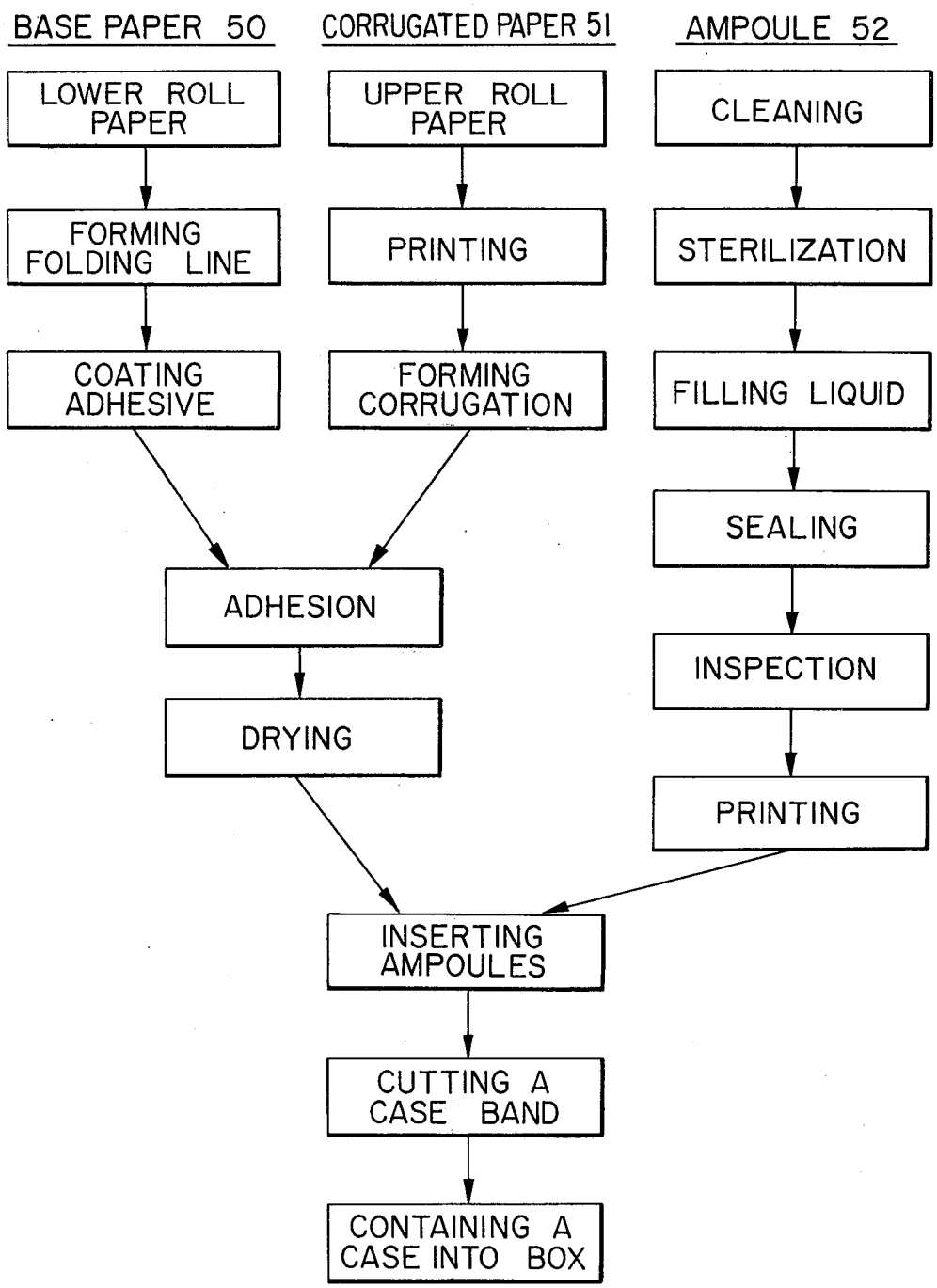
FIG. 2 is a block diagram showing a packaged ampoule to which the fixed length cutting apparatus according to the present invention is applied for the purpose of obtaining the product as shown in FIG. 1.

In FIG. 2, a conventional process is shown in the block diagram in which how the product shown in FIG. 1 is obtained and how it is placed in the case are described, and the apparatus according to the present invention is used in the process called "cutting a case band". Of course, this process is primarily carried out in pharmaceutical companies.

Figure 3:
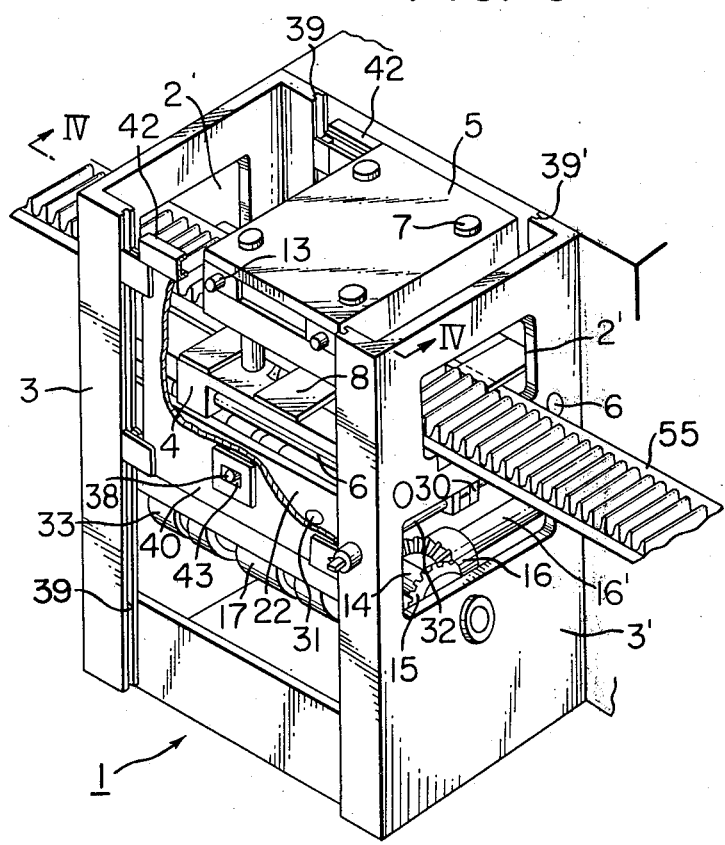
FIG. 3 is a perspective view of one embodiment of the present invention in which part thereof is cross sectioned.

In FIG. 3 and successive drawings, there is shown one embodiment of the apparatus according to the present invention which is used in such locations.

Reference numeral 1 denotes a main frame of box type, and openings 2 and 2' are formed at opposed positions of upper parts of both side frames 3 and 3' of said frame 1, and at the lower parts of the openings 2 and 2', a pair of horizontal guide shafts 6 are horizontally mounted.

The lower part of the lower cutter base 4 is slidably supported on the guide shafts 6, and at the upper surface of the cutter base 4, four vertical guide shafts 7 are erected, and between the guide shafts 7, a lower cutter 10 is provided on the upper surface of the cutter base 4 perpendicularly with respect to its travelling direction, and also on the upper surface of the cutter base 4, a plurality of guide plates 8 are mounted, and the tips are spaced from the upper surface of the cutter base 4 for guiding both side edges of the workpiece, namely, in this embodiment, the ampoule case band 55, and at the under surface of the cutter base 4, a rack 12 is mounted along the travelling direction.

On the guide shafts 7, an upper cutter base 5 is slidably supported, and an upper cutter 9 is vertically provided at a position opposed to the lower cutter 10 and is disposed at the under surface of base 5. Also, at the front and rear side edges of base 5, a pair of horizontally spaced rollers 13 are provided.

A driving shaft 14 is disposed below the guide shaft 6 in parallel therewith, and its both ends are axially supported on the side frames 3 and 3', and a bevel gear 15 fixed to the shaft 14 is meshed with a bevel gear 16 fixed to a driving shaft 16'. The shaft 14 is provided with cylindrical cams 17 and 33 fixed thereon. In a cam groove 17' of the cam 17, a cam roller 19 is slidably fitted, which roller 19 is mounted on a reciprocating plate 18 which is shiftable in a direction parallel to shaft 6. The upper surface of said reciprocating plate 18 has a high gear rack 20 and a low gear rack 21 are fixed with a predetermined interval. The cam groove 17' is formed in such a way that the reciprocating plate 18 makes one reciprocating motion in the lateral direction when the cam 17 makes one turn, and the speed of the reciprocating plate 18 is increased gradually at the initial period of the forward motion stroke and is decreased gradually at the termination period, and in the backward motion stroke, it makes a quick backward motion.

The reciprocating plate 18 is supported with its cone shaped edges at right and left sides by means of a supporting roller goup provided on a pair of supporting plates 23 and 23' which are laterally mounted between a pair of front and rear templates 22 and 22', which templates extend between the side frames 3 and 3'.

Figure 5:
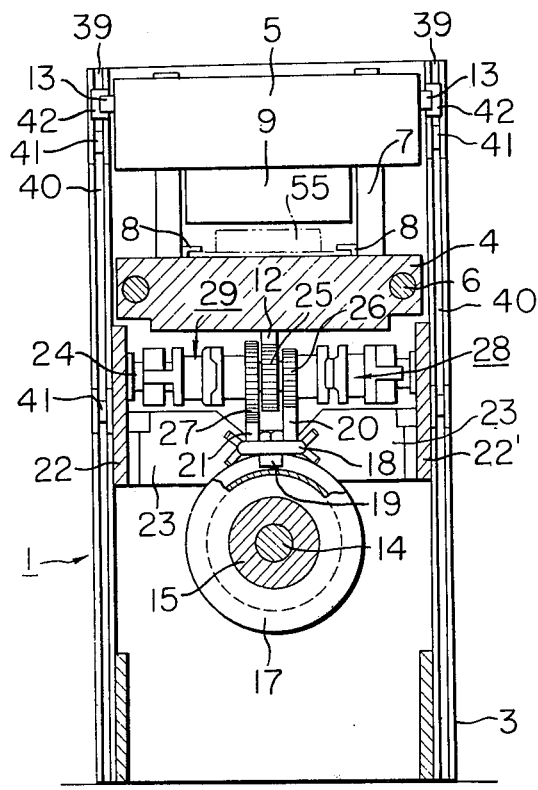
FIG. 5 is a cross sectional view when viewed in the direction of an arrow which is cross sectional along a line V—V of FIG. 4.

Between the cutter base 4 and the reciprocating plate 18, a counter shaft 24 is disposed whose both ends are rotatably supported on the templates 22 and 22', and this shaft 24 is fixed with a gear 25 that meshes with the rack 12 as shown in FIG. 5. Gears 26 and 27 that are meshed with the racks 20 and 21 are rotatably supported on the shaft 24, and the gears 26 and 27 are detachable with the shaft 24 by means of clutches 28 and 29. These clutches 28 and 29 are arranged in such a way that when one of the clutches is engaged by a shifter 30, the other clutch is disengaged, and the shifter 30 is slidably fitted on a shaft 31 that is laterally mounted between the templates 22 and 22', and is screwed to a screw 32 that is rotatably supported on the side frame 3' and when the screw 32 is rotated, the shifter 30 is adapted to be displaced. The racks 20 and 21 and also the gears 26 and 27 are preferably of helical teeth.

In a cam groove 33' of the cam 33, a cam roller 36 is slidably fitted which is provided at the tip of a lever 35 whose base end is firmly fixed to a rotatable shaft 34 whose both ends are rotatably supported between the templates 22 and 22'. The base end of another lever 37 is firmly fixed on the shaft 34, and at the tip of the lever 37, a roller 38 is pivotally supported.

This cam 33 is provided for vertically moving the upper cutter 9 as will be described hereinafter but the cam groove 33' is formed in such a way that the end of the downward stroke of the upper cutter 9 comes slightly earlier than the end of the forward motion stroke of the upper and lower cutters 9 and 10 in the lateral direction.

Vertical grooves 39 and 39' are formed at opposed edges of the both side frames 3 and 3', and guide rollers 41 provided on the upper and lower parts of opposed vertical plates 40 are slidably fitted therein. At the upper end edge of each vertical plate 40, a guide rail 42 is mounted and the rollers 13 of the upper cutter base 5 are slidably fitted on the guide rails 42. At the lower part of the vertical plate 40, a laterally elongated hole 43 (FIG. 3) is formed and the roller 38 of the lever 37 is slidably fitted in the hole 43.

Next, the operating condition of the foregoing apparatus will be explained as follows.

Figure 4:
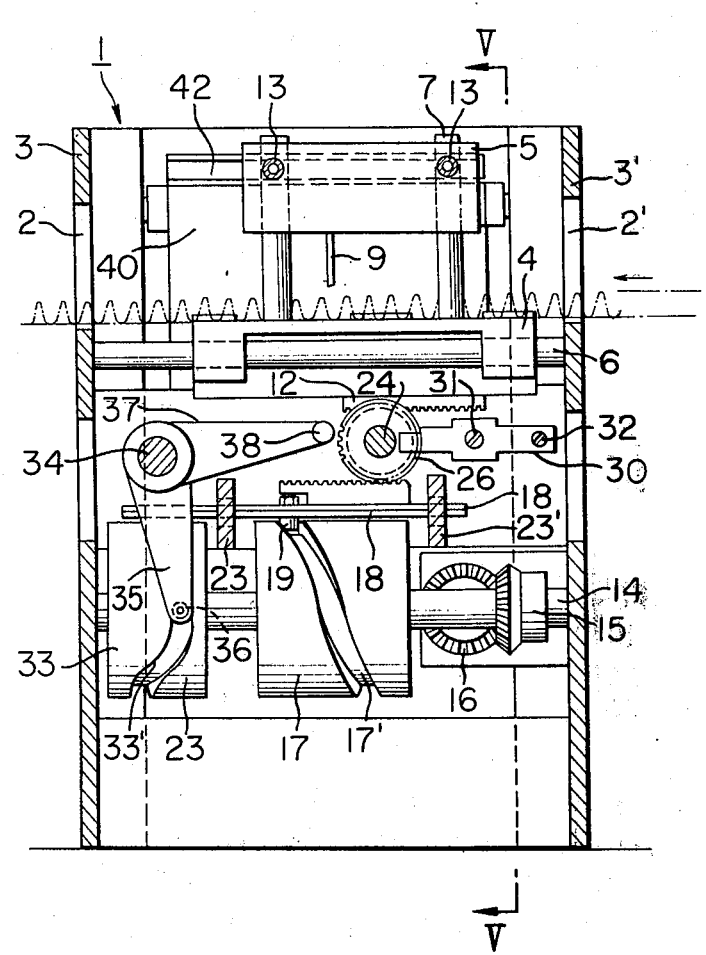
FIG. 4 is a cross sectioned view along a line IV—IV of FIG. 3.

FIG. 4 shows the condition where the operation of the apparatus starts, and in this condition, the shifter 30 is previously manipulated by screw 32 depending on the desired length of the workpiece, namely the ampoule case 53 so that either one of the large and small gears 26 or 27 is caused to clutchably engage the counter shaft 24.

As described in the foregoing, the apparatus which is set in an operation preparation condition is made to operate, and as shown in FIG. 3, the uncut ampoule case band 55 is fed at a fixed speed by means of a feeding mechanism not shown in the drawing through the opening 2 of one of the side frames 3.

Figure 6:
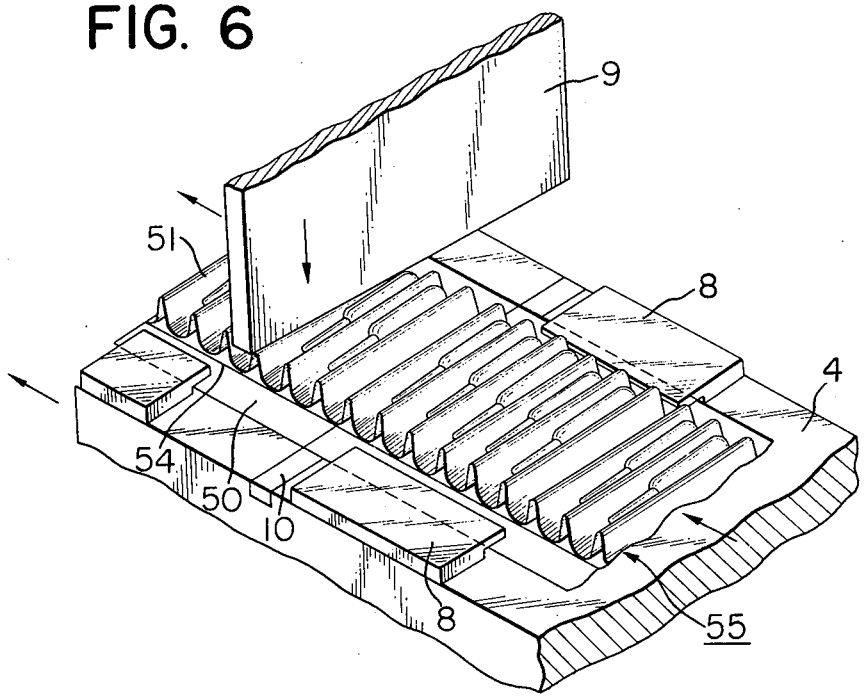
FIG. 6 is an enlarged perspective view of the part showing the cut condition of the ampoule case in accordance with the present invention.

In this case, at the valley of the corrugated paper 51 of the band 55, the ampoule 52 is previously inserted by a device which is not shown in the drawing, but as shown in FIG. 6, the ampoule 52 is not inserted into the valley portion corresponging to the location to be cut. Accordingly, the manipulation of the shifter 30 and the inserting manipulation of the ampoule 52 are mutually related and if the length of the case 53 becomes longer, the length between the valleys where the ampoule is not inserted becomes longer, and if the former becomes shorter, of course, the latter also becomes shorter.

The band 55 which is arranged in this way is fed by said feeding mechanism, and both side end edges, as shown in FIG. 6, are inserted in the gaps formed between the upper surface of the lower cutter base 4 and the lower surface of the tip of the guide plates 8.

On the other hand, in this apparatus, with the rotation of the driving shaft 14, the cams 17 and 33 rotate and due to the rotation of the cam 17 and its engagement with roller 19, the reciprocating plate 18 is slidably moved in a righthand direction in FIG. 4, and accordingly, the gears 26 and 27 which are meshed with the racks 20 and 21 rotate. One of the gears 26 and 27 is engaged with the shaft 24 by either one of the clutches 28 and 29 which is selected by the shifter 30, so that the shaft 24 rotates at a speed corresponding to the peripheral speed of either one of the engaged gears 26 and 27, and the lower cutter base 4 provided with the rack 12 engaged with the gear 25 fixed to the shaft 24 is thus shifted in lefthand direction as viewed in FIG. 4. As the lower cutter base 4 has the upper cutter base 5 mounted thereon by means of the guide shafts 7, the upper cutter base 5 also is shifted in lefthand direction.

With the rotation of the cam 33, the lever 35 starts to rotate in the clockwise direction in FIG. 4, and the lever 37 rotates in the same direction by the shaft 34. As the roller 38 of this lever 37 is slidably fitted into the hole 43 of the vertical plate 40, with the rotation of the lever 37, the vertical plates 40 are made to descend along the grooves 39 and 39'. As the rollers 13 of the upper cutter base 5 are slidably fitted on the guide rails 42 on the upper end of the vertical plates 40, the upper cutter base 5 also descends in accordance with the descending motion of the vertical plates 40.

As described in the foregoing, the upper and lower cutters 9 and 10 move forward in lefthand direction, and at the position just slightly before the end of the forward motion stroke thereof, the descending stroke of the upper cutter 9 is completed, and in this case, the case band 55 is cut by the upper and lower cutters 9 and 10, but at this time, the feeding speed of the case band 55 and the forward motion speed of the upper and lower cutters 9 and 10 are equal, and with this arrangement, the case band 55 is constantly cut at the valley portion of the corrugated paper 51 to which the ampoule 52 is not inserted, and also the reason for arranging that the end of the descending stroke of the upper cutter 9 is set earlier than the end of the forward motion stroke of the upper and lower cutters 9 and 10 is that the upper cutter 9 is prevented from colliding with the valley portion of the corrugated paper 51 of the succeeding case band 55 at the time of ascending of the upper cutter 9.

As described in the foregoing, when the cutting operation is completed, the upper and lower cutters 9 and 10 have a backward motion in the lateral direction, and at the same time, the upper cutter 9 ascends and returns to the original position.

Although particular preferred embodiments of the invention have been disclosed hereinabove for purpose of illustration, it will be understood that variations or modifications thereof which lie within the scope of the invention as defined by the appended claims are fully contemplated.

Namely, as the workpiece according to the present invention, the ampoule case is enumerated, but the present invention may be, of course, applied to any cutting of articles other than said ampoule, and also as for changing of the stroke, two gears are used, but gears whose number is more than two pieces may be used, and also with respect to the lateral motion mechanism and vertical motion mechanism, mechanisms having other structures may be employed.

What is claimed is:

1. An apparatus for cutting a moving object to a predetermined length, comprising:
    a frame;
    a lower cutter base means movably supported on said frame for reciprocating movement in a substantially horizontal direction, said lower cutter base means having a transferring path on the upper surface thereof and substantially parallel to said horizontal direction for permitting conveyance of the object to be cut;
    an upper cutter base means spaced above said lower cutter base means and supported for movement upwardly and downwardly relative to said lower cutter base means, and means coacting between said upper and lower cutter base means for causing synchronous reciprocating lateral movement thereof;
    upper and lower cutters mounted on the respective upper and lower base means and disposed opposite one another for cutting an object;
    a first movement mechanism for causing reciprocating movement of said upper and lower cutting base means in said horizontal direction to effect, at least during a portion of the forward stroke of said base means, a velocity of said base means corresponding to the velocity of the moving object;
    said first movement mechanism including rotatable drive shaft means supported on said frame, a first cylindrical cam nonrotatably mounted on said drive shaft means, and a positive drive linkage connected between said first cylindrical cam and one of said base means for causing a positively driven forward and backward reciprocating movement of said upper and lower cutter base means; and
    a second movement mechanism for causing reciprocating vertical movement of said upper base means to effect cutting of said object during the forward stroke of said base means, said second movement mechanism including a second cylindrical cam nonrotatably mounted on said drive shaft means and link means connected between said second cam and said upper cutter base means for causing vertical reciprocating movement of said upper cutter base means in response to rotation of said second cam.

2. An apparatus as defined in claim 1, which is adapted to cut to a fixed length a moving band like object consisting of a plate-like support paper and a corrugated paper bonded onto the surface of said support paper by adhesive.

3. An apparatus according to claim 1, wherein said positive drive linkage as connected between said first cam and said one base means includes a first gear rack supported for reciprocating horizontal movement in a direction substantially parallel to said horizontal direction, said first gear rack being drivingly interconnected to and reciprocated by said first cam upon rotation thereof, a second gear rack attached to said lower cutter base means, and intermediate gear pinion means drivingly engaged with said first and second racks.

4. An apparatus according to claim 3, wherein said first rack includes first and second gear rack portions of different heights disposed adjacent one another, and said gear pinion means including first and second coaxial gear pinions respectively disposed in meshing engagement with said first and second rack portions, said first and second gear pinions being of different diameters, and said gear pinion means including a third gear pinion coaxial with said first and second gear pinions and disposed in meshing engagement with said second rack, and clutch means for selectively clutchably engaging one of said first and second gear pinions to said third gear pinion to permit the horizontal stroke of said lower cutter base means to be varied.

5. An apparatus according to claim 1, wherein said first cylindrical cam has cam profile means for causing a gradually accelerated movement of the upper and lower cutter base means during the initial phase of the forward stroke, for causing a gradual decelerated movement of the upper and lower cutter base means during the closing phase of the forward stroke, and for causing a quick returning movement of both cutter base means during the backward stroke, and wherein the second cylindrical cam has profile means for causing the downward stroke of the upper cutter base means to be terminated and reversed prior to the termination of the forward stroke of the cutter base means.

6. An apparatus according to claim 5, wherein said first and second cylindrical cams are each of a barrel-like shape and are fixed to a common drive shaft in coaxial relationship with one another, each of said cams having an annular cam groove surrounding the respective cam and extending in an axial direction thereof.

7. An apparatus according to claim 1, wherein said link means includes lever means coacting between said second cylindrical cam and said upper cutter base means.

8. An apparatus according to claim 1, wherein said lower base means is constrained solely for movement relative to said frame in said horizontal direction, and wherein said upper base means is vertically slidably supported on said lower cutter base means so that said upper cutter base means can be vertically reciprocated relative to said lower cutter base means and relative to said frame, and said upper cutter base means being constrained for horizontal reciprocating movement with said lower cutter base means.

9. An apparatus according to claim 1, wherein said drive shaft means includes a driving shaft rotatably supported on said frame and disposed with the rotational axis thereof extending substantially parallel to said horizontal direction, and said first and second cylindrical cams each comprising a barrel-shaped cam nonrotatably secured to said driving shaft, each of said cams having an annular cam groove disposed so as to surround same and extending axially thereof, said positive drive linkage including a first cam follower disposed in engagement with the groove formed in said first cam and constrained for reciprocating movement in a direction which is substantially parallel to the axis of said driving shaft, and said link means including a second cam follower disposed in engagement with the groove formed in said second cam and constrained for movement in a direction which is substantially parallel to the rotational axis of said driving shaft.

* * * * *